United States Patent Office.

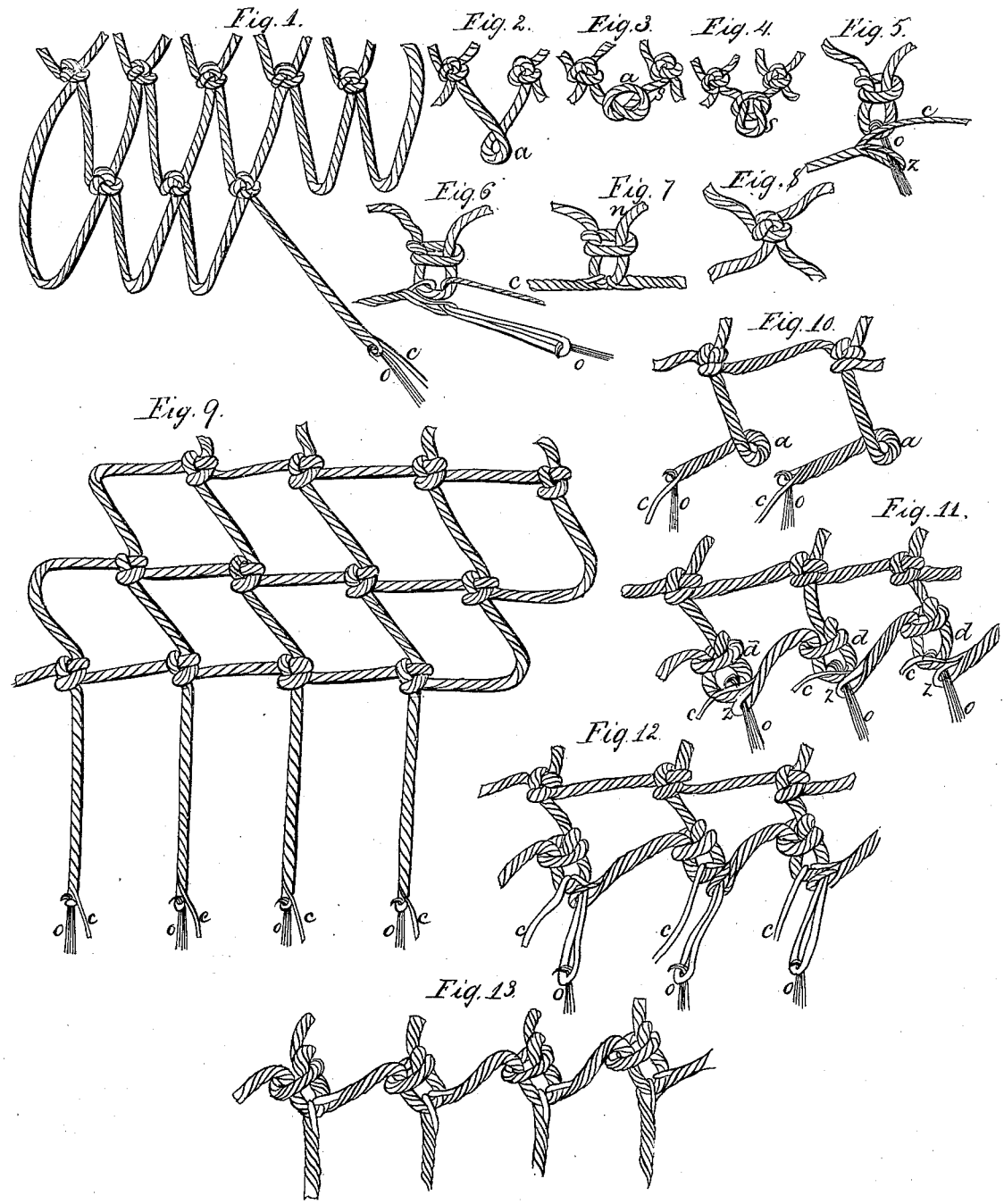

BENJAMIN ARNOLD, OF EAST GREENWICH, RHODE ISLAND.

Letters Patent No. 78,716, dated June 9, 1868.

IMPROVEMENT IN NETS FOR FISHING.

The Schedule referred to in these Letters Patent and making part of the same.

TO ALL WHOM IT MAY CONCERN:

Be it known that I, BENJAMIN ARNOLD, of East Greenwich, in the county of Kent, in the State of Rhode Island, have invented certain new and useful Improvements in Making Nets and Netting for Fishing and other purposes; and I do hereby declare that the following is a full and correct description thereof, reference being had to the accompanying drawings, and to the letters of reference marked thereon.

My present improvements differ from those upon which the office allowed my application for a patent, January 7, 1867, in this respect: In that case I used a full-sized twine, in connection with a strand or small twine; in this, I use the strand or small twine exclusively.

Figure 1 shows a piece of netting partially finished, showing the manner in which the netting operation proceeds from loop to loop. This netting is begun in the same way as in making netting in the usual manner, that is, by taking successive bights of a cord to form the first loops, which cord may be afterwards trimmed off, if desired.

Figure 2 shows how a part of the knot is made with the loop of the last row of meshes, a half turn having been made in it.

Figure 3. The lower part of the half turn $a$ is laid upon one of the arms $s$ of the mesh-loop, and in Figure 4 the same arm is brought through the half turn, making, as in my former application, a bight of twine, $s$, projecting through a half hitch, so called, and is ready for the passage of the hook $c$, upon which the loop of fresh twine is held.

Figure 5. The hook $o$, having passed through the free strand $c$, is caught by it, and is drawn (Figure 6) back through both the mesh-loop and strand-loop $z$, until enough twine is drawn through the loops to form the next mesh.

Figure 7 shows the loops all ready to be drawn up into a knot, which is done by tightening the mesh-twine $n$, and drawing the bight out of the half hitch, which draws the small twine through the same, and secures it (see Figure 8.) Then the same process is gone through with the next loop, back and forward across the side of the netting, until it is large enough.

Figure 9 shows a variation in the work when a number of twines and hooks are used at the same time, and the knot-loops are made in the twine between the last row of knots and the hooks $o\ o\ o$, instead of the last row of meshes, as before. To start this net, form a series of loops, such as are represented on the hooks in fig. 9, which are made by taking the end of each twine and doubling, so as to form a bight with a long twine by the side of it; tie the upper ends of the twine together, and secure them to a series of pins; then, by putting the hooks $o\ o$ into these bights, and twisting the three parts of the twine together, they will appear as in the lower part of fig. 9, ready to proceed with, as hereinafter described.

Figure 10 shows a half turn taken in the twines, through which an arm of the mesh is drawn, as in fig. 4.

Figure 11 shows the hooks $o\ o\ o$, with the loops $z$ of strand-twine on them, passed through the loops $d\ d$, to catch and draw through the free strand-twines $c\ c$.

Figure 12. The strands are drawn through, and

Figure 13 shows the knots or loops ready to be drawn up, as before, in fig. 8, which finishes the knots, and the twines and hooks, as in fig. 9, are ready to go through the same operation with the twine next to them, always in one direction, instead of backwards and forwards, as in fig. 1.

The strands and loops on the hooks may be twisted between the knots or not, as may be preferred, by means of the hooks $o\ o$. The manner of making the large loops may be varied in several ways, without changing materially the principle of the knot, which is a very secure one.

Some of the advantages of making netting this way are, that it can be made faster, as the twine can be used from large spools, without the great loss of time occasioned by having to fill shuttles. It can be made cheaper, as the process of doubling and twisting the twine previously is dispensed with.

Having thus described my invention, what I claim, and desire to secure by Letters Patent, is—

1. The method herein described, of interlooping, twisting, and forming a net of a continuous length of cord, substantially as described.

2. I claim netting constructed as herein described, as a new article of manufacture.

BENJAMIN ARNOLD.

Witnesses:
HORACE N. FOSTER,
WM. D. ARNOLD.